Dec. 10, 1946.    H. M. JENSEN    2,412,508
POWER UNIT FOR REELING CABLE OR WIRE
Filed Dec. 2, 1943    6 Sheets-Sheet 1

INVENTOR.
Harry M. Jensen
BY
Attys.

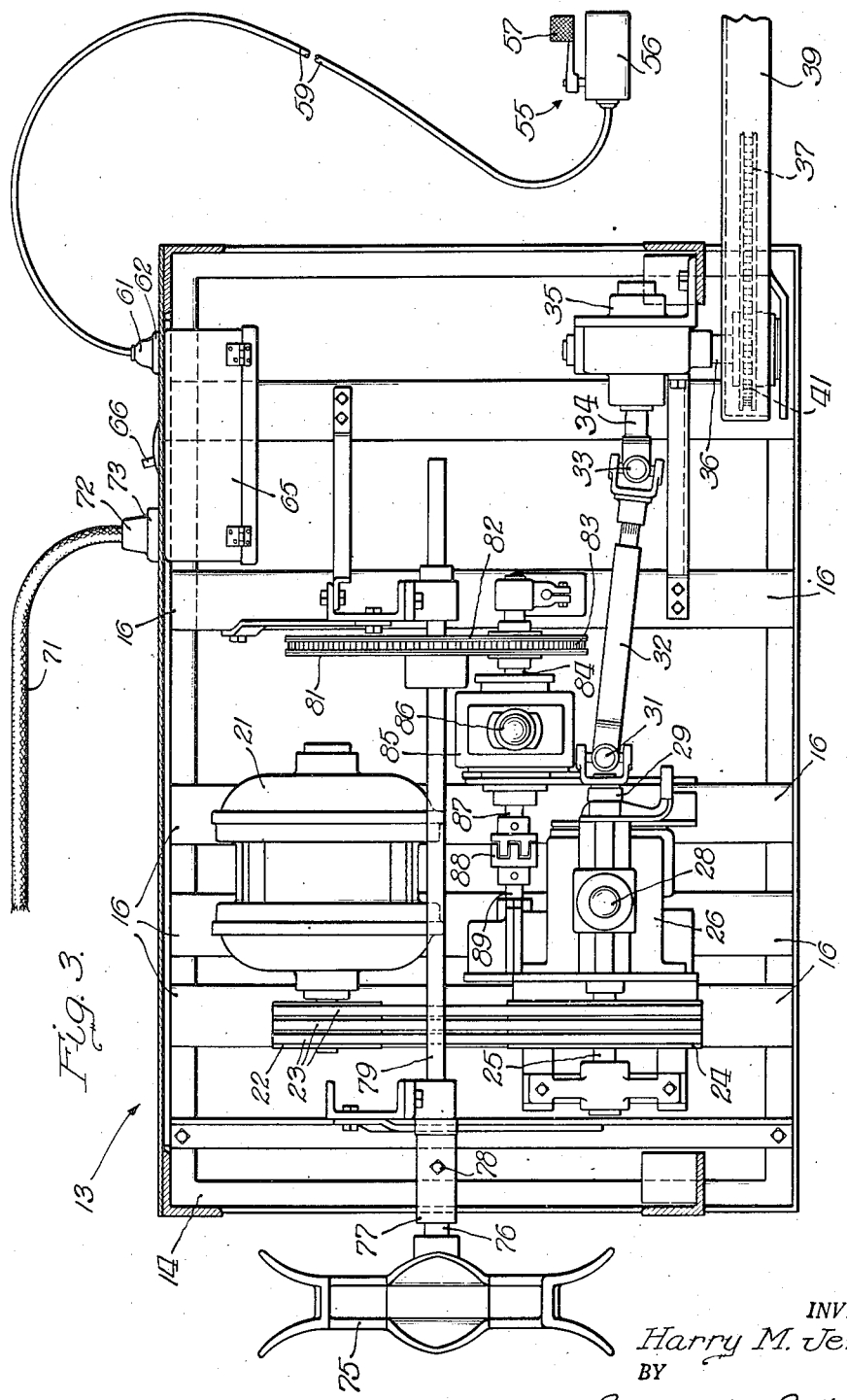

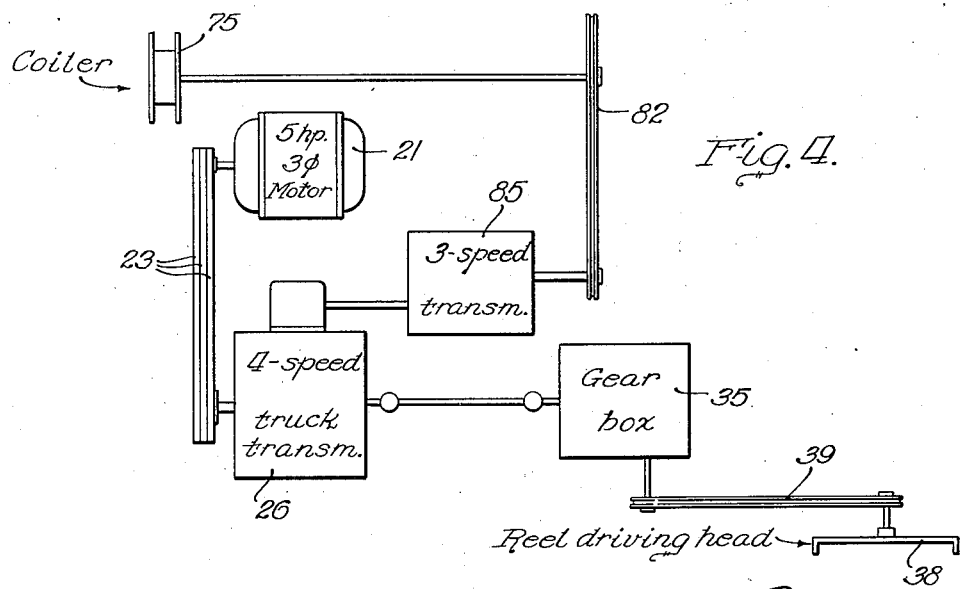
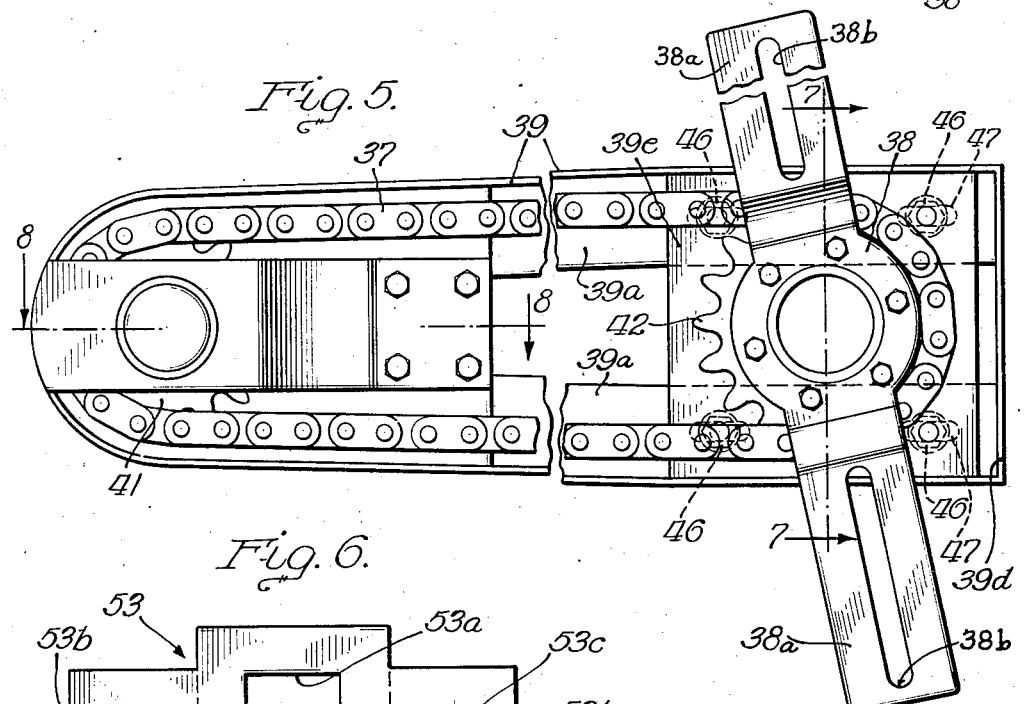

Dec. 10, 1946.  H. M. JENSEN  2,412,508
POWER UNIT FOR REELING CABLE OR WIRE
Filed Dec. 2, 1943  6 Sheets-Sheet 4
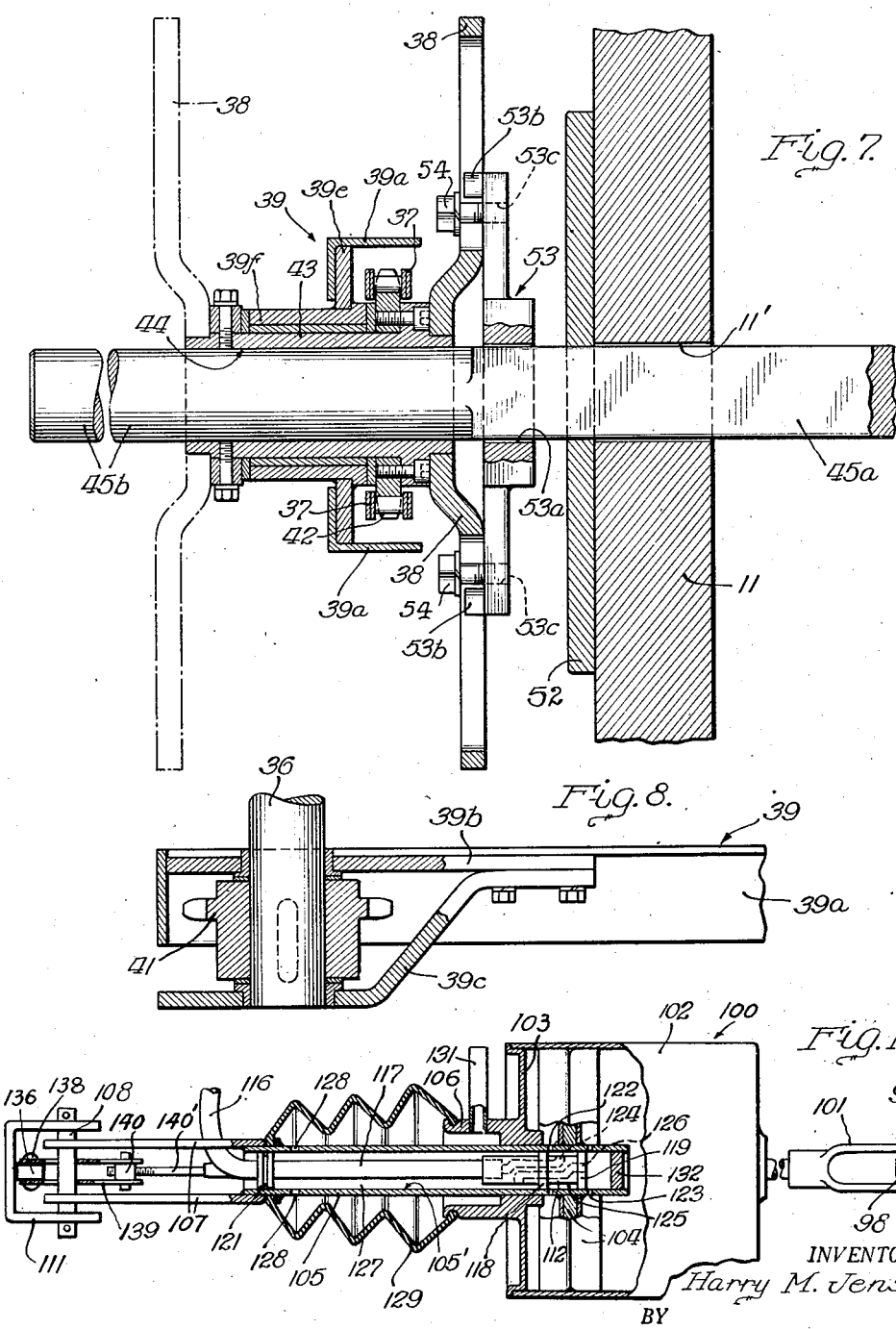
INVENTOR.
Harry M. Jensen
BY
Brown, Jackson, Boettcher & Dienner
Attys.

Dec. 10, 1946.    H. M. JENSEN    2,412,508
POWER UNIT FOR REELING CABLE OR WIRE
Filed Dec. 2, 1943    6 Sheets-Sheet 5

INVENTOR.
Harry M. Jensen
BY
Brown, Jackson, Boettcher & Dienner
Attys.

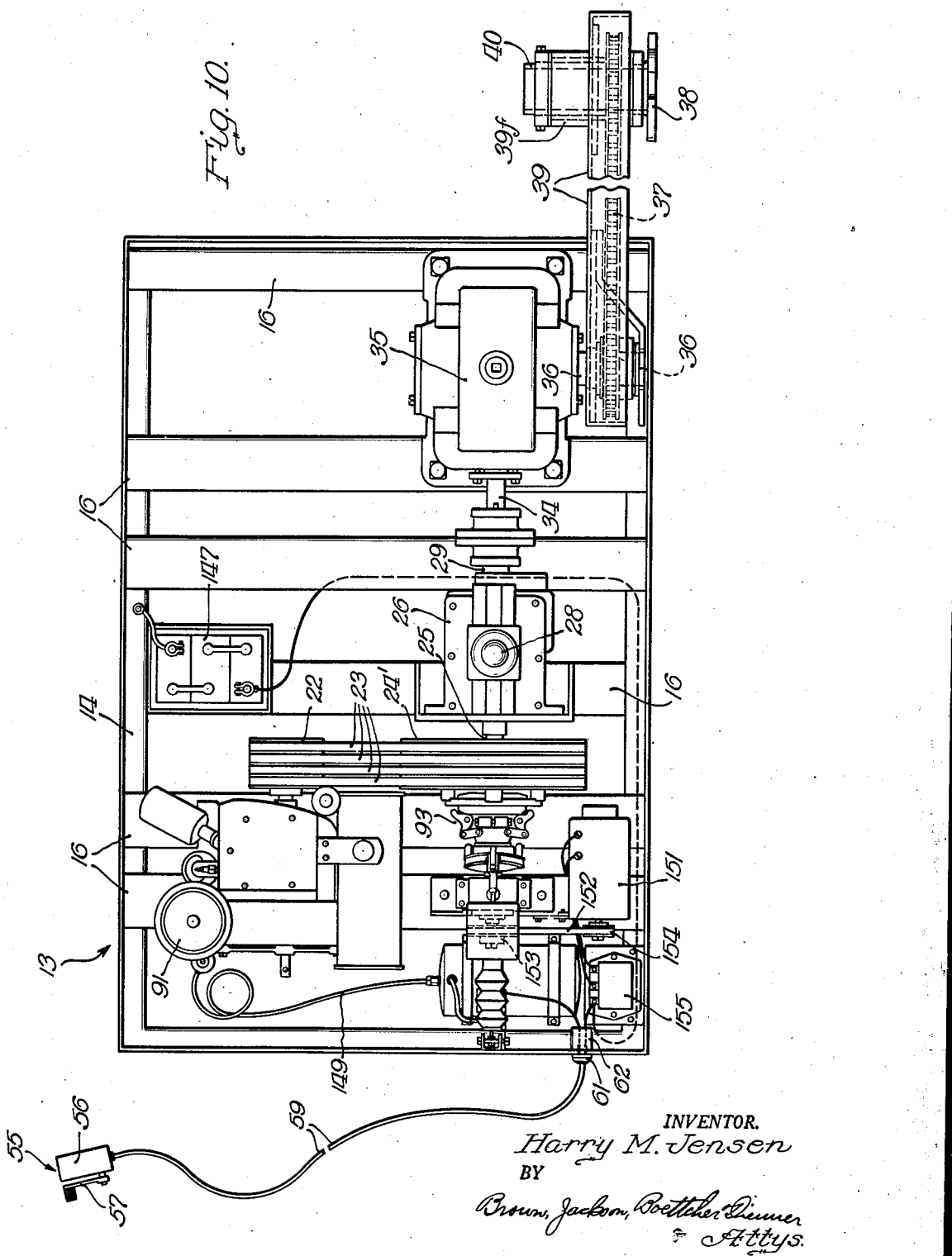

Patented Dec. 10, 1946

2,412,508

UNITED STATES PATENT OFFICE 2,412,508

POWER UNIT FOR REELING CABLE OR WIRE

Harry M. Jensen, Chicago, Ill.

Application December 2, 1943, Serial No. 512,534

8 Claims. (Cl. 242—54)

The present invention relates to an improved portable power unit for reeling heavy cable or heavy wire. The invention has its greatest field of utility when employed to drive the large reels on which lead covered cable is wound. Such lead covered cable is typically represented by telephone cable, or electric distribution cable, or high voltage transmission cable. Such lead covered cable is often wound on reels as large as eight feet in diameter, and a fully loaded reel of this size may weight as much as 14,000 pounds. In addition to the great weight of the loaded reel, the stiffness of the lead covered cable aggravates the problem of winding the cable on or off a large reel by manual effort. Because of the weight of the reel and the stiffness of the cable the job of winding cable on or off a large reel by manual effort alone may often require as many as six to ten men. This problem of reeling and unreeling heavy cable occurs constantly in connection with running cable into and out of street manholes, into and out of underground ducts, winding cables from one reel to another, and also in connection with the reeling and handling of submarine cables used in mined harbors.

The general object of the present invention is to provide a portable power-driven reeling unit for transmitting a power drive to these large cable reels.

Another object of the invention is to provide such a machine characterized by a swiveled drive arm through which the power drive is transmitted from the reeling unit to the reel, this arm being swiveled to the reeling unit for vertical swinging movement so that the swinging end of said arm can be moved upwardly or downwardly to different heights for establishing driving connection with cable reels of widely different diameters.

Another object of the invention is to provide a power driven cable reeler characterized by an improved foot control which can be situated in any desired position several feet away from the power driven reeling unit and which enables the operator to control the starting and stopping of the reel while standing in a position which enables him to guide the path of the cable or to watch the cable while the latter is entering or leaving a manhole, duct, etc.

Another object of the invention is to provide a machine of the above general description with a power-driven collapsible coiler for coiling line conductors and the like.

Other objects, features, and advantages of the invention will be apparent from the following detailed description of two preferred embodiments thereof.

In the accompanying drawings illustrating such embodiments:

Figure 3 is a plan view with the cover removed, showing the operating mechanism of the machine;

Figure 4 is a schematic diagram of the train of power transmission to the reel driving head and to the coiler;

Figure 5 is a fragmentary side elevational view of a driving yoke which is used when the reel is mounted on a square shaft;

Figure 6 is a side elevational view of the driving yoke which is employed when the reel is supported on a square shaft;

Figure 7 is a vertical sectional view taken on the plane of the line 7—7 of Figure 5, showing the driving head connected to the reel through the above yoke and square shaft;

Figure 8 is a horizontal sectional view taken on the plane of the line 8—8 of Figure 5, showing the swiveled mounting which permits the driving arm to have vertical swinging movement;

Figure 10 is a plan view of the latter embodiment; and

Figure 11 is a detail view of the suction actuated clutch control mechanism used in this engine driven embodiment.

Figures 1, 2:
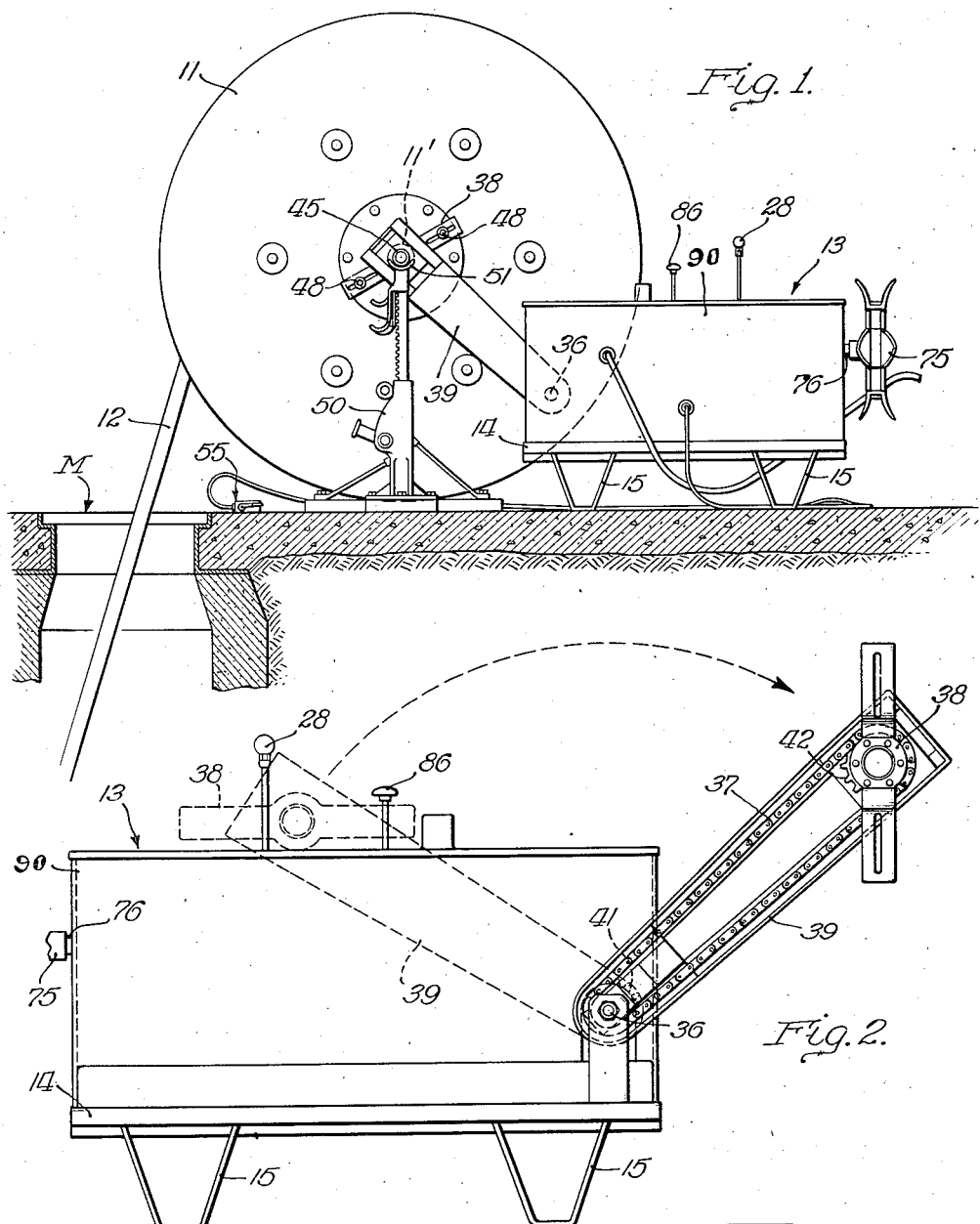
Figure 1 is a side elevational view of my improved power cable reeler, showing it connected to a cable reel in the act of reeling cable.
Figure 2 is a similar view of the other side of the unit, on a larger scale, showing how the drive arm can be swung to different positions.

Referring to Figures 1 and 3, I have illustrated a conventional cable reel, indicated in its entirety at 11, on which a typical lead covered cable 12 is wound. My improved power unit for driving reels of this type is indicated in its entirety at 13. Such unit comprises a main frame 14 which can be in the form of a conventional platform skid having supporting skids or brackets 15 extending down from each of the four corners of the platform. The platform is thus normally supported in an elevated position above the ground so as to enable a conventional lift truck to be run in endwise under the platform. In this manner the lift truck can be actuated to raise the power unit 13 to a position which clears the skids 15 from the ground, thereby enabling the power unit to be readily wheeled to another position where it can be lowered to place the skids 15 back upon the ground in close proximity to another cable reel which is to be driven. The angle iron frame 14 of the power unit carries a plurality of transverse channel bars 16 to which the various parts of the power unit are bolted.

In the embodiment illustrated in Figures 1, 2, and 3, the source of power consists of an electric motor 21 which may be either of the alternating current type or the direct current type, depending upon the source of supply. The armature shaft of this motor carries a multiple groove pulley 22 which transmits a drive through a plurality of V-belts 23 to a large sheave 24. This large sheave is mounted on a shaft 25 constituting the power input or drive shaft of a selective speed transmission mechanism 26. This transmission unit may be of any desired type capable of giving the range of speeds which are desirable for driving the cable reel. In the exemplary embodiment illustrated I have employed a conventional four-speed automobile transmission of a type heretofore used on trucks of a well-known make. Because such a transmission unit is very well known, there is no need of describing it in detail. Four selective forward speeds and one reverse speed are obtainable through proper manipulation of the gear shift lever 28 projecting upwardly from the transmission mechanism.

The power output shaft 29, projecting from the rear end of the transmission mechanism 26, is connected through a universal joint 31 with a propeller shaft 32 which, in turn, is connected through another universal joint 33 with the power input shaft 34 entering a worm type of speed reducing gear unit 35. This worm gear speed reducer 35 which I have employed in one embodiment of my invention affords a speed reduction of 17 to 1, but it will be understood that other ratios may be employed and other types of speed reducing units may also be employed. Projecting from the output side of the speed reducer 35 is the drive shaft 36 which is adapted to transmit a drive to the cable reel. The drive is transmited from said drive shaft 36 through a drive chain 37 leading out to a driving head 38 mounted in the outer end of a vertically swiveling drive arm 39. The inner end of the driving chain 37 passes over a sprocket wheel 41 mounted on the shaft 36, and the outer end of said chain passes over a sprocket wheel 42 which is secured to the driving head 38. The swivelled power transmitting arm 39 is preferably made up of two spaced angle bars 39a, 39a which enclose the chain 37 and sprockets 41 and 42 so as to function as a guard for these elements. The swiveled ends of the bars 39a are welded or otherwise secured to bearing members 39b, 39c (Figure 8) which have swiveled mounting on the drive shaft 36 for enabling the power transmitting arm 39 to be swung to different angular positions around the axis of the shafts 36. The outer ends of the angle bars 39a are joined by a transverse bar 39d welded thereto, and mounted for sliding adjustment between said angle bars is a bearing plate 39e to which is secured a horizontally extending bearing boss 39f (Figures 5 and 7). The driving head 38 and outer sprocket 42 are mounted on the outside of a hollow spindle 43 which is journaled in the bearing boss 39f. The hollow driving head 38 and hollow bearing spindle 43 provide a through opening 44 for receiving a reel supporting shaft 45. If desired, adjusting means may be provided for shifting the position of the assembly 38, 40, 42 to adjust the tension of the driving chain 37, this adjusting means being shown as comprising bolts 46 carried by the mounting plate and passing through slots 47 in the angle bars 39a (Figure 5).

Referring to Figure 1, in establishing a driving connection between the driving unit 13 and the cable reel 11, the driving unit 13 is picked up on a wheeled lift truck, and the unit 13 is then wheeled into position adjacent to the side of the reel 11, substantially as illustrated in Figure 1. The swivelled power transmitting arm 39 is now swung around the axis of the drive shaft 36, and the apparatus is maneuvered to place the axial opening 44 in the hollow spindle 43 in alignment with the axial opening 11' in the reel 11, whereupon the reel supporting shaft 45 is then slid endwise through the axial opening 11' in the reel and through the hollow spindle 43, with a portion of the shaft extending out beyond the spindle. The driving arms 38a of the driving head are now brought up into proximity to or against the adjacent side surface of the reel 11, these arms being provided with slots 38b for receiving the driving bolts 48, 48. These bolts are then threaded into separate driving sleeves which are inserted into standard driving holes normally provided in the face of the reel, thereby establishing a positive driving connection between the driving arms 38a and the reel. Lifting jacks 50 are now placed at each side of the reel with their lifting yokes or saddles 51 engaging under the projecting ends of the reel supporting shaft 45. The jacks 50 are then actuated to raise the reel 11 a sufficient distance so that it will clear the ground and rotate freely. The ability of the power transmitting arm 39 to swivel around the axis of the drive shaft 36 readily accommodates this lifting movement of the reel 11, and also readily accommodates the establishment of a driving connection with reels of different sizes. The power unit 13 may be left on the wheeled lift truck during the operation of driving the reel 11, or the lift truck may be removed from under the power unit after the unit has been placed in proper position relatively to the reel and preferably after the driving connection has been established with the reel through the driving head 38 and bolts 48. In the operating relation illustrated in Figure 1, the reel 11 is shown as reeling cable 12 up through a manhole M in a street or paving, but it will be understood that this is merely exemplary of one of many situations in which it may be desired to transmit a power drive to a cable reel.

In some instances the reel 11 may be arranged to be driven by a square shaft 45a, as shown in Figure 7. In such case either the openings 11' in the reel are of square formation or end collars 52, provided with square holes, are secured to the ends of the reel for receiving the square portion 45a of the shaft. Each end of this square shaft is formed with a cylindrical portion 45b capable of passing through the cylindrical opening 44 of the driving head sleeve 43 so as to have rotatable bearing mounting on the lifting yokes or saddles 51 of the lifting jacks 50. Driving engagement between the driving head 38 and the reel is established through a driving yoke 53 illustrated in Figure 6. This yoke has a square hole 53a for receiving the square portion 45a of the shaft. Lugs 53b projecting from the arms of the yoke engage in the slots 38b of the driving arms 38a for transmitting the driving torque.

Cap screws 54 pass through the slots 38b and thread into tapped holes 53c in the yoke 53 for holding the yoke against disengagement from the driving arms.

The stopping and starting of the drive to the reel 11 is preferably placed under the control of a portable foot switch 55 which can be placed at any desired position relatively to the reel 11 and power unit 13. In Figure 1 I have illustrated this foot control switch 55 in proximity to the manhole M where the operator would stand so as to be able to observe the movement of the cable upwardly out of the manhole. As best shown in Figure 3, this foot switch comprises a base portion 56 and a treadle member 57, the treadle being connected to electrical contacts disposed within the base portion 56 and so arranged that the contacts are closed when the treadle is depressed. A flexible two-wire extension cord 59 extends from the foot switch 55 to a prong type of plug 61 which is adapted to be plugged into a receptacle 62 mounted on the frame of the power unit. This receptacle is connected to an automatic primary-resistor starter 65 which governs the energization of the electric motor 21. This starter control also preferably includes a suitable reversing switch 66 for causing the motor 21 to run in a reverse direction, the operation of the unit after the reversed connections have been established still remaining under control of the foot switch 55. The motor 21 is ordinarily a three-phase motor, and hence the reversal thereof can be easily accomplished by shifting phases with respect to the stator or rotor, or by using other well known reversing expedients. The ability to reverse the electric motor 21 enables the full range of selective speeds of the four speed transmission 26 to be utilized for driving the reel 11 in either direction. The supply connection to the power unit is effected through a flexible supply cable 71 (having three conductors when supplying three phase current), this cable connecting through a detachable female plug 72 which is adapted to be received within a prong receptacle 73 mounted on the unit, such prong receptacle being connected with the starter control 65.

That embodiment of my improved power unit illustrated in Figures 1, 2, 3, and 4 also comprises a power driven coiler 75 for coiling line conductor and the like. This coiler is located at any convenient point on the machine, preferably at the end opposite to the swivelled power transmitting arm 39. The coiler is of the well known collapsible type which can be collapsed for removing the coil of wire therefrom after the coiling operation has been completed. The coiler can be removed and replaced as desired, and to this end it is secured to a stub shaft 76 which is adapted for detachable mounting in a driving socket 77 where it can be secured by a set screw 78 (Figure 3). The driving socket 77 is carried on the end of a drive shaft 79 carrying a large sprocket wheel 81. A chain 82 runs from this large sprocket wheel down to a sprocket pinion 83 mounted on the output shaft 84 of a selective speed transmission mechanism 85, typically represented by a three speed automotive transmission, these speed selections being made through the usual gear shift lever 86. The input shaft 87 of the transmission 85 is connected through a suitable coupling 88 with a power take-off shaft 89 leading from the first mentioned transmission 26. This latter arrangement of transmitting the drive from the power take-off 89 is preferable because such power take-off has the benefit of the speed reduction afforded by the belt drive from the motor 21. The operation of the coiler 75 is, of course, subject to starting and stopping through control exercised by the foot switch 55 which may be placed in position so that the operator can manipulate this foot switch at the same time that he is guiding the winding of the conductor on the coiler. The coiler can also be reversed through the reversing switch 66.

The electric motor, transmissions, and various drives of the power unit 13 are preferably enclosed within a removable cover 90 which is adapted to set down over the supporting frame 14 of the power unit. The selective speed gear shift levers 28 and 86 project upwardly through suitable openings in this cover 90. When the power transmitting arm 39 is not in use it can be folded back into a position where the outer end thereof rests on the cover, as indicated in dotted lines in Figure 2, thereby reducing the overall dimensions of the unit for more compact storage.

Figure 9:
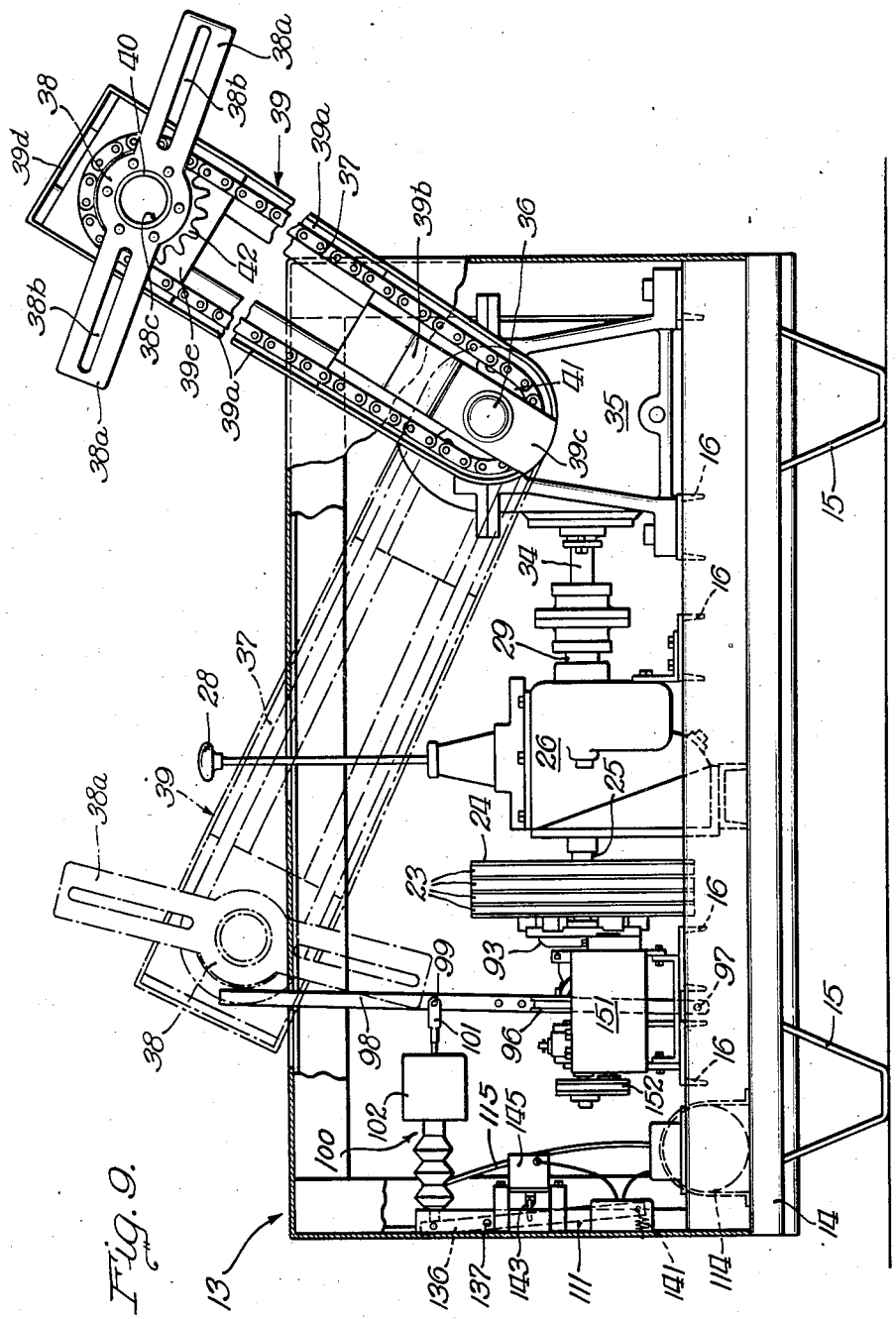
Figure 9 is a side elevational view, with the cover broken away, showing a modified construction of reeling unit which is powered by a gasoline engine.

Referring now to the embodiment illustrated in Figures 9, 10 and 11, this modified form of unit differs principally from the previously described unit in that an internal combustion engine 91 has been substituted for the electric motor 21, thereby making the power unit adaptable to use in situations where a supply of current is not available. In this embodiment the starting and stopping of the drive to the cable reel is also controlled through the manipulation of a foot switch 55, but in such embodiment the foot switch is arranged to electrically control a vacuum responsive clutch which governs the transmission of power from the internal combustion engine to the selective speed transmission unit 26, as I shall presently describe.

The internal combustion engine 91 may be of the single cylinder air-cooled type developing anywhere from four to ten horsepower. The engine shaft carries a multiple groove pulley 22 which transmits a drive through a plurality of V-belts 23 to a large sheave 24′, which is preferably mounted for free rotation on roller bearings carried by the power input shaft 25 of the selective speed transmission mechanism 26. This large sheave 24′ is adapted to transmit rotation to said power input shaft 25 through the medium of a control clutch 93 which responds to the manipulation of the foot switch 55, as will be presently described. The transmission unit 26 is preferably of the conventional automotive type affording four forward speeds and one reverse, as described of the preceding embodiment. The power output shaft 29, leading from this transmission, is connected with the power input shaft 34 of the speed reducing worm gear unit 35, which has been previously described. This worm gear unit 35 transmits rotation through drive shaft 36, sprocket 41, chain 37, and sprocket 42 to the driving head 38 rotatably mounted in the swinging outer end of the swivelled power transmission arm 39, substantially as described of the preceding embodiment.

The control clutch 93 is preferably of the friction type in order to obtain a gradual smooth engagement, although it will be understood that other types of clutches may be used if desired, such as a hydraulic clutch. The clutch engaging parts are arranged to respond to the axial shifting movement of a conventional clutch shifting collar (not shown) which is embraced by and operatively connected with a shifting fork or yoke 96 pivoted at its lower end at 97 (Figure 9). An operating lever 98 extends upwardly from the shifter yoke 96 and is pivotally connected at 99 with a clevis 101 rigidly secured to the closed end of a shifting vacuum cylinder 102. This vacuum cylinder is part of a complete vacuum responsive operating unit 100, preferably of the construction recently made by Bendix for the vacuum operated gear shift system used on cars of a popular make. As shown in Figure 11, the other end of this vacuum cylinder 102 is also closed by a head 103, and mounted within the cylinder between said closed end and head is a piston 104. The piston is secured to the end of a piston rod 105 which passes out through a guide boss 106 extending from the head 103. The outer end of the piston rod carries a relatively long clevis 107 which has a transverse pivot pin 108 passing therethrough, this pivot pin also passing through the sides of a vertically extending frame channel 111 for establishing a stationary supporting pivot for this end of the vacuum operated unit 100.

Vacuum or suction is adapted to be connected selectively to either end of the cylinder 102 by a slide valve 112 reciprocating within the piston 104 and piston rod 105, this slide valve admitting suction to the right hand end of the cylinder and atmosphere to the left hand end in one shifted position of the valve, and then admitting suction to the left hand end and atmosphere to the right hand end in the other shifted position of the valve. This valve action in the above Bendix device is old and well known and need not be described in detail. Suffice it to say that in the diagrammatic arrangement illustrated, the suction is conducted from a suction storage tank 114 through a flexible tube 115 which connects with a downwardly turned supply tube 116 which joins with a tubular valve stem 117, the latter carrying the slide valve 112, as shown in Figure 11. The valve is formed with two annular cut-off rings 118 and 119 adjacent to the right hand end, and with a closure ring 121 adjacent to the left hand end. These three rings have a snug sliding fit within the bore 105' of the hollow piston rod 105. The cut-off ring 118 is adapted to cooperate with a valve port 122 in the form of an arcuate slot or holes cut in the hollow piston rod 105 to the left of the piston 104. The other cut-off ring 119 is adapted to cooperate with a similar valve port 123 also in the form of an arcuate slot or holes cut in the piston rod to the right of the piston. The suction transmitted through the hollow valve stem 117 communicates through a passageway 124 with the annular space 125 between the cut-off rings 118—119. An atmosphere venting passage 126 extends from the end face of the slide valve past the cut-off rings and opens laterally out into the annular space 127 defined within the hollow piston rod 105 between the rings 118 and 121. Ports 128 open from this annular space out into a telescoping rubber boot or hood 129, and the interior of this boot communicates with atmosphere through the tube 131 projecting from the boss 106 of cylinder head 103. The far end of the hollow piston rod is closed by a closure disk 132.

It will be evident from the foregoing that when the slide valve 112 occupies the left hand position illustrated, the left hand end of the cylinder is connected to suction through port 122 and passageway 124, and the right hand end of the cylinder is connected to atmosphere through port 123 and passageway 126. This condition causes the cylinder 102 to shift to the right, such being the clutch engaging position of the vacuum control unit. When the slide valve 112 is shifted to the right, the right hand end of the cylinder is connected to suction through port 123 and passageway 124, and the left hand end of the cylinder is connected to atmosphere through port 122 and space 127. This condition causes the cylinder to shift to the left, such being the clutch releasing position.

The slide valve 112 is shifted from one position to the other through the motion of a valve actuating lever 136 which is mounted to have rocking movement between the two side flanges of the vertical frame channel 111. The lever 136 is pivoted on a pin 137 extending between the flanges of said channel, and the upper end of said lever is pivotally connected at 138 to a clevis 139 which is adjustably connected through a swiveled nut 140 and threaded rod 140' to the end of the suction supply tube 116 for shifting the valve. A tension spring 141 (Figure 9) is connected between the web of the channel 111 and the lower end of the lever tending to swing the lever in a clockwise direction, thereby normally tending to hold the slide valve 112 shifted to its right hand position. Pivotally connected to said lever between the fulcrum pivot 137 and the spring 141 is a link 143 which is connected to the shiftable core of a solenoid 145. This solenoid is connected in circuit with the remote control foot switch 55, such circuit being energized by the storage battery 147. The operating relation is such that when the operator steps on the foot switch 55 the solenoid 145 is energized, thereby swinging the lever 136 in a counterclockwise direction and shifting the slide valve 112 to its left hand position. This admits suction to the left hand end of the cylinder 102 and causes the cylinder to shift to the right for engaging the clutch, as previously described. When the operator takes his foot off the foot switch 55 the solenoid 145 deenergizes, the slide valve 12 shifts to the right, the cylinder 102 shifts to the left and the clutch is disengaged. Thus, the clutch is power actuated both to its closed and opened positions, this being done with a smooth graduated motion. The clutch is preferably of the type wherein the shifting or actuating parts built into the clutch assembly go through a slight over-center motion or a slight over the hump action just as the friction elements engage in the clutch engaging operation. This means that the clutch is then operative to remain in effective engagement without the necessity of the vacuum cylinder 102 exerting a heavy pressure through the clutch operating lever 98.

The vacuum stored in the storage tank 114 is obtained from the intake manifold or carburetor of the internal combustion engine 91 through tube 149, a suitable vacuum check valve being interposed in this suction connection to retain the vacuum stored in the tank 114. The storage battery 147 is charged by a generator 151 which is shown as being driven from the shaft of clutch 93 through a belt 152 and belt pulleys 153 and 154, although it will be understood that this generator may be connected directly to the engine crank-shaft. The charging system may be regulated by a voltage control unit 155. If desired, the engine may be equipped with an electric starter.

While I have illustrated and described what I regard to be the preferred embodiments of my invention, nevertheless it will be understood that such are merely exemplary and that numerous modifications and rearrangements may be made therein without departing from the essence of the invention.

I claim:

1. In portable power driving apparatus for driving a cable reel, the combination of jack means for raising the cable reel to an elevated driving position, a portable frame in proximity to said reel while the latter is in said elevated driving position for performing cable reeling and unreeling operations, a power source on said frame, a drive shaft on said frame adapted to be driven from said power source, control means for varying the speed of rotation of said drive shaft, an adjustable drive arm swiveled to said frame for swinging movement concentrically of said drive shaft, and a drive head rotatably mounted in the outer end of said arm, driven from said drive shaft, and operative to drive the reel while the latter is supported on said jack means.

2. In portable power drive apparatus for driving a cable reel, the combination of portable jack means for raising the cable reel to a free driving position, a portable frame, a power source on said frame, a drive shaft on said frame, a variable speed transmission mechanism interposed between said power source and said drive shaft for varying the speed of rotation of said drive shaft, an adjustable drive arm swiveled to said frame for swinging movement around the axis of said drive shaft, a drive head rotatably mounted in the outer end of said drive arm for rotation about an axis substantially at right angles to said arm, means connecting said drive shaft with said drive head, and detachable coupling means for coupling said drive head with the end of the cable reel for driving the latter while the reel is supported on said jack means.

3. In a portable power drive unit for driving a cable reel, the combination of a portable frame capable of being moved from place to place for establishing driving connection with different cable reels, a source of power on said frame, and a power transmitting arm for connecting said source of power with the reel, said arm being swiveled upon said frame for vertical swinging movement in a plane substantially parallel to the side of the cable reel, a drive shaft substantially coincident with the swivelling axis of said arm, a driving head mounted in the outer end of said arm for rotation about an axis disposed substantially at right angles to the length of said arm, power transmission means extending between said drive shaft and said driving head, and means for coupling said driving head with the cable reel.

4. In a portable power drive unit for driving a cable reel, the combination of a portable frame adapted to be moved from place to place in the performance of cable reeling and unreeling operations, a source of power on said frame, a drive shaft on said frame driven by said source of power, and a vertically swinging power transmission arm for coupling said drive shaft with the cable reel, said arm being swiveled for rotative movement on the axis of the drive shaft and substantially parallel with the end of the reel, a sprocket wheel mounted on said drive shaft within said arm, a hollow spindle journaled in the outer end of said swinging arm, a sprocket wheel secured to said hollow spindle, a sprocket chain trained over said sprocket wheels and extending outward of said arm, and means for aligning the cable reel with said hollow spindle and transmitting a drive to said reel comprising a reel shaft extending through said hollow spindle and means for connecting said hollow spindle with the reel.

5. In a portable power drive unit for driving a cable reel, the combination of a portable frame adapted to be moved from place to place in the performance of cable reeling and unreeling operations, a source of power on said frame, an adjustable drive arm for coupling said source of power with said cable reel, said drive arm being swiveled to said frame for vertical swinging movement, a driving head rotatably mounted at the outer end of said arm, said driving head adapted to be axially aligned with the reel supporting shaft on which the reel is rotatably mounted, and a driving yoke having a polygonal drive opening therein adapted to be coupled to said driving head and to establish driving engagement over a reel supporting shaft of polygonal cross section.

6. In a portable power driven reeling unit, the combination of a portable frame, an internal combustion engine on said frame, drive means for transmitting a drive from said engine to the reel, a clutch for controlling the connection between said engine and said drive means, suction responsive means governing the engagement of said clutch, and portable control means movable to different positions relatively to said reeling unit for controlling said suction responsive means.

7. In a portable power drive unit comprising a cable reel, the combination of a portable frame adapted to be moved from place to place in the performance of cable reeling operations, an internal combustion engine on said frame, drive means for transmitting a drive from said internal combustion engine to the cable reel, a clutch for controlling the power transmitting connection between said engine and said drive means, vacuum responsive means for governing the engagement of said clutch, said vacuum responsive means deriving said vacuum from said engine, and a portable foot switch operative to electrically govern said vacuum responsive means.

8. In a portable drive unit for driving a cable reel, the combination of a portable frame adapted to be moved from place to place in the performance of cable reeling and unreeling operations, an internal combustion engine on said frame, a drive arm for transmitting a drive from said internal combustion engine to the cable reel, said drive arm comprising a driving head rotatably mounted in the outer end of said drive arm for rotation on an axis substantially at right angles to said arm, quick detachable coupling means for coupling said driving head to the end of a cable reel substantially in axial alignment therewith, a clutch for controlling the power transmitting connection between said engine and said driving head, vacuum responsive means for governing the engagement of said clutch, said vacuum responsive means deriving said vacuum from the engine, and a portable electric foot switch operative to electrically govern said vacuum responsive means.

HARRY M. JENSEN.